United States Patent [19]
Moriyama et al.

[11] 3,960,751
[45] June 1, 1976

[54] ELECTRO-OPTICAL DISPLAY ELEMENT

[75] Inventors: Akio Moriyama, Katano; Masakazu Fukai, Nishinomiya; Hiroshi Tatsuta, Katano; Hiroaki Takahashi, Moriguchi, all of Japan

[73] Assignee: Matsushita Electric Industrial Co., Ltd., Japan

[22] Filed: Sept. 16, 1974

[21] Appl. No.: 506,056

[30] Foreign Application Priority Data
Sept. 19, 1973 Japan.............................. 48-106310
Oct. 31, 1973 Japan.............................. 48-123161

[52] U.S. Cl............................. 252/299; 23/230 LC; 252/408; 350/150; 350/160 LC
[51] Int. Cl.²........................ G02F 1/16; C09K 3/34; G02F 1/13
[58] Field of Search...................... 252/299, 408 LC; 350/160 LC, 150; 23/230 LC

[56] References Cited
UNITED STATES PATENTS
3,597,044  8/1971   Castellano .................... 252/408 LC
3,703,329  11/1972  Castellano .......................... 252/299
3,864,022  2/1975   Moriyama et al................... 252/299
3,900,248  8/1975   Nagasaki ...................... 350/160 LC

*Primary Examiner*—Benjamin R. Padgett
*Assistant Examiner*—T. S. Gron
*Attorney, Agent, or Firm*—Wenderoth, Lind & Ponack

[57] ABSTRACT

An electro-optical element comprising a nematic liquid crystal composition and at least one compound represented by the formula:

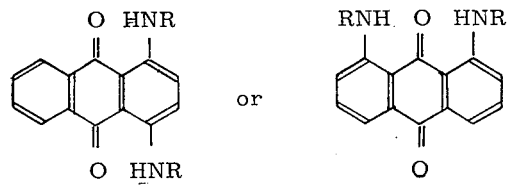

wherein R is an alkyl radical having from 4 to 20 carbon atoms.

Said compounds are pleochroic dyes having a special function which differs from hitherto known dyes in their interaction with nematic liquid crystal molecules. The electro-optical element makes it possible to obtain a liquid crystal display device which exhibits the desired figure in color differing from background colors.

8 Claims, 7 Drawing Figures

1,8 BISBUTYLAMINOANTHRAQUINONE

FIG.1a.

1,4-BISBUTYLAMINO ANTHRAQUINONE

FIG.1b 1,8 BISBUTYLAMINOANTHRAQUINONE

ELECTRO-OPTICAL DISPLAY ELEMENT

BACKGROUND OF THE INVENTION

1. Field of the Invention

The present invention relates to an electro-optical element composed of nematic liquid crystal compositions having pleochroic dyes dissolved therein.

More particularly, it pertains to an electro-optical element making use of compositions of nematic liquid crystals containing at least one species of dyestuff represented by the undermentioned chemical formulae:

wherein $R_1$ and $R_2$ are radicals chosen from the group consisting of alkyl radical having from 5 to 20 and from 4 to 20 carbon atoms respectively.

2. Description of the Prior Art

In general, a liquid crystal device is usually composed of two parallel flat plates whose inner surfaces are coated with thin electrodes. Said plates are held at a distance of several microns apart e.g. several tens of microns, and in the space between said plates there is contained a liquid crystal composition. The optical characteristics of this device may be controlled by means of an electric or magnetic field.

When an electric field is applied to a layer of a nematic liquid crystal having a pleochroic dye dissolved therein; the layer exhibits turbulent motion or the molecules in the layer are orientated along the direction of the electric field and the dye molecules exhibit co-operative behavior with the nematic liquid crystal molecules, whereby a change in the optical absorption of the device is obtained.

In order to increase the optical absorption change of the device, it is desirable that the nematic liquid crystal layer have homeotropic, homogeneous or twisted structure, wherein the arrangement of the nematic liquid crystal is governed, according to the differences in the dielectric anisotropy of the nematic liquid crystal and the direction of the applied electric field.

For example, when using nematic liquid crystals having negative dielectric anisotropy, the dye molecules are placed in homeotropic structure (a structure in-which the long axis of the liquid crystal molecules is aligned perpendicular to the vessel wall), and when using nematic liquid crystals having positive dielectric anisotropy, they are placed in the homogenous or twisted structure (a structure in which the long axis of the liquid crystal molecules is aligned parallel to the vessel wall).

In the liquid crystal device, where the nematic liquid crystal molecules are arranged in a predetermined direction, the molecular axis of the liquid crystal can be controlled to turn a maximum of 90° by applying an electric field.

As the dye molecules are oriented co-operatively with the alignment of the nematic liquid crystal materials in the electric field, a display with high contrast can be obtained in the aligned phase of a nematic liquid crystal.

As dyes, azo, anthraquinone, azine, xanthene and related coloring matter and other dyes which are soluble in the liquid crystalline substances are available.

Of these dyes, some induce a change in the optical absorption of the device, and some do not, when they are aligned with the liquid crystal, and an electric field is imposed on them.

The dyes may be further classified by four different functions based on the way in which the change of optical absorption of the device (the change of state from that when the electric field is not applied to that when the electric field is applied takes place; as follows:

1. Dyes which change from the colorless state to colored state.
2. Dyes which change from the colored state to colorless state.
3. Dyes which change from a colored state to another colored state showing a different hue.
4. Dyes which do not undergo the change of state when the electric field is applied.

Displays with color to color contrast can be achieved by mixing a plurality of dyes which have different hue and different function in display performance.

Most of the customary pleochroic dyes are long cylindrically shaped molecules that show little or no absorption of light in the direction along their long axis and absorption of light in the direction along their short axis. When such dyes are placed in the nematic liquid crystal layer having a homeotropic structure at an appropriate concentration such that no unoriented molecules remain, the transmitted light appears to the observer in the colorless state with no applied field and in the colored state when an orientating field is applied.

Moreover, when they are placed in a nematic liquid crystal layer having an homogeneous or twisted structure, the transmitted light appears to the observer in the colored state with no applied field and in the colorless state when an orienting field is applied.

The dyes of this kind include compounds such as:

(Orange),

(Yellow),

(Red), (Scarlet red), (Black), (Blue), or  (Green), etc.

OBJECTS OF THE INVENTION

The dyes employed for the element of this invention are dyes having a different function contrasting with the above-listed dyes. Thus, when the dye molecule is placed in the aligned phase of the liquid crystal, the transmitted light along the long axis of the liquid crystal molecule appears to the observer in the colored state with no applied field, while the transmitted light along the short axis of the liquid crystal molecule is observed in the colorless state with no applied field.

No dyes of this kind have ever been discovered. They are truly novel dyes.

Therefore, it is an object of the present invention to provide an electro-optical element comprising a nematic liquid crystal and novel pleochroic dyes to control the color displayed in the electro-optical device in a manner different from that employed using conventional dyes.

It is another object of the present invention to provide an electro-optical element comprising a nematic liquid crystal and a mixture of the novel pleochroic dye and the conventional one to display the background and the figure of the electrooptical device in the different colors.

A further object of the present invention is to control the color exhibited by a pleochroic dye in polarized light.

A further object of the present invention is to provide a novel display device.

A further object of the present invention is to provide novel display systems.

Those objects are achieved by providing a electro-optical element and an electro-optical display device according to the present invention. The electro-optical element comprises a nematic liquid crystal and at least one compound represented by the formula wherein $R_1$ and $R_2$ are alkyl radicals having from 5 to 20 and from 4 to 20 carbon atoms respectively. The electro-optical display device comprises: two parallel transparent members whose inner surfaces have been coated with transparent electrodes; an electro-optical element comprising a nematic liquid crystal and at least one compound represented by the formula wherein $R_1$ and $R_2$ are alkyl radicals having from 5 to 20 and from 4 to 20 carbon atoms respectively, said electro-optical element being interposed, filling the space between said electrodes and having all its molecules in their quiescent state, nonelectrically aligned perpendicular or parallel to such facing surface; and means for selectively applying an electric field across said electro-optical element through said electrodes to exceed a threshold electric field.

BRIEF DESCRIPTION OF THE DRAWINGS

Other objects and advantageous features of the present invention will become apparent from the following description of some embodiments thereof, taken together with the accompanying drawing, in which;

FIG. 1, (a), diagramatically shows the spatial arrangement of a dye molecule in the liquid crystal, as a typical example of conventional dyes.

FIG. 1, (b) and (c) diagramatically show the spatial arrangement of the dye molecule of this invention in a liquid crystal.

DETAILED DESCRIPTION OF THIS INVENTION

That the dyes used according to this invention, i.e., the 1,4-bisalkyl-amino-anthraquinone dye or 1,8-bisalkyl-amino-anthraquinone dye, have special functions is attributable to the special molecular configuration of these dyes.

These dyes are believed to show slight absorption in the direction along the long axis of the anthraquinone ring, being the chromogen, and have the main absorption axis in the direction along the short axis of the ring.

In the oriented structure of the nematic liquid crystal, it may be supposed that the molecular chain of the alkylamino radical, being the auxochrome in these dyes, is arranged parallel to the long axis of the liquid crystal molecule, while the long axis of the anthraquinone ring extends in the perpendicular direction thereto, so that a stable spatial arrangement may be achieved.

For this reason, transmitted light along the long axis of the liquid crystal molecules appears to the observer in the colored state, after being absorbed by this dye.

Figure 1A:
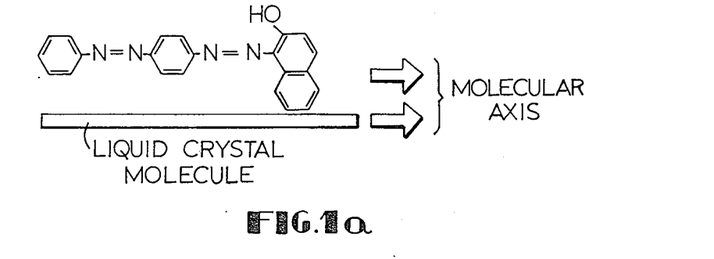

FIG. 1, (a), diagramatically shows the spatial arrangement of a red dye in the liquid crystal, as a typical example of a conventional dye. Its long molecular axis is aligned parallel to the long molecular axis of the liquid crystal, and for this reason, the light transmitted along this axial direction is observed in the colorless state when white incident light is irradiated thereon.

Figure 1B:
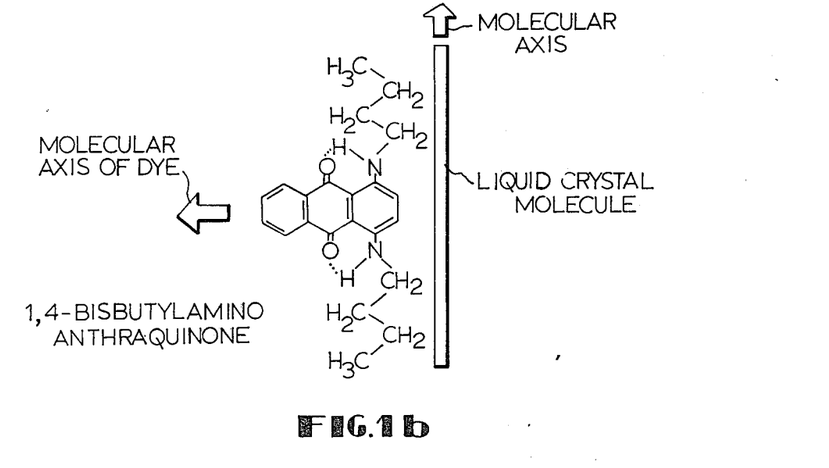
Figure 1C:
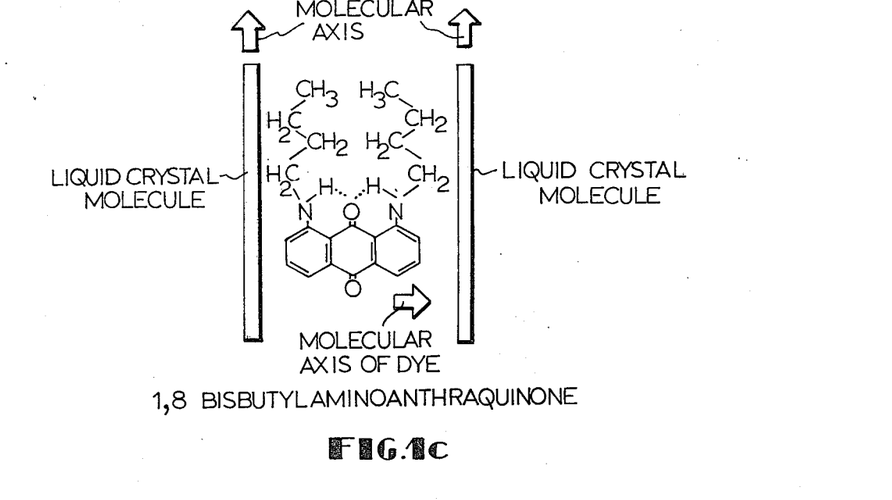

In contrast FIG. 1, (b) and (c), diagramatically show the spatial arrangement of the dyes of this invention in the liquid crystal. (b) Illustrates 1, 4-bisalkylaminoanthraquinone, and (c) 1,8-bisalkylaminoanthraquinone. The long molecular axis of the anthraquinone ring is aligned in the direction perpendicular to the long molecular axis of the liquid crystal molecule. For this reason, the light transmitted along the molecular axis of the liquid crystal molecule is observed in the colored state.

In the following examples of dyes used in the electro-optical element of this invention and embodiments of the liquid crystal devices making use of such an element are described:

Embodiment 1

First of all, examples of dyes used according to this invention are listed in Tables 1 and 2, giving the colors and melting points thereof.

Table 1.

1,4-bisalkylaminoanthraquinone

| Compound No. | R | Color of dye | Melting point (°C) |
|---|---|---|---|
| 1. Butyl | n-$C_4H_9$ | Light reddish violet | 120 |
| 2. Pentyl | n-$C_5H_{11}$ | Light reddish violet | 117 |
| 3. Hexyl | n-$C_6H_{13}$ | Dark reddish violet | 95 |
| 4. Heptyl | n-$C_7H_{15}$ | Dark blue | 93 |
| 5. Octyl | n-$C_8H_{17}$ | Dark blue | 77 |
| 6. Nonyl | n-$C_9H_{19}$ | Bluish violet | 81 |
| 7. Dodecyl | n-$C_{12}H_{25}$ | Blue | 85 |
| 8. Octadecyl | n-$C_{18}H_{37}$ | Blue | 96 |

Table 2.

1,8-bisalkylaminoanthraquinone

| Compound No. | R | Color of dye | Melting point (°C) |
|---|---|---|---|
| 1. | Butyl | n-$C_4H_9$ | Reddish violet | 110 |
| 2. | Hexyl | n-$C_6H_{13}$ | Blackish violet | 97 |
| 3. | Heptyl | n-$C_7H_{15}$ | Blackish violet | 84 |
| 4. | Octyl | n-$C_8H_{17}$ | Dark reddish violet | 70 |
| 5. | Decyl | n-$C_{10}H_{21}$ | Reddish violet | 83 |
| 6. | Dodecyl | n-$C_{12}H_{25}$ | Dark reddish violet | 88 |
| 7. | Octadecyl | n-$C_{18}H_{37}$ | Reddish violet | 96 |

These dyes may be manufactured in the following ways:

(Manufacture of 1,4-bisalkylaminoanthraquinone.)
For example, in manufacturing 1,4-bis-dodecylaminoanthraquinone, 2.7 g (0.01 mol) of leucoquinizaline and 9 g of n-dodecylamine in 30 ml of pyridine are refluxed overnight. Initially the solution is brown in color. It turns blue after being refluxed. The reaction mixture is poured into a 10% aqueous solution of hydrochloric acid. The separated product is filtered off, and then, is refined by recrystallizing it with the use of methyl cellosolve.

Other compounds may also be obtained by reacting leucoquinizaline with the corresponding alkylamines in the similar way.

These dyes all give their maximum absorption at 652 nanometers in benzene and their solutions are colored blue.

(Manufacturing of 1,8-bisalkylaminoanthraquinone)
For example, in manufacturing 1,8-bisbutylaminoan-thraquinone, 4.8 g (0.0173 mols) of 1,8-dichloroan-thraquinone, 0.112 g of copper, 4.3 g of sodium acetate and 33 g (0.451 mols) of n-butylamine are mixed. The mixture is boiled while stirring for 2 hours, and after cooling, it is poured into 10% aqueous solution of hydrochloric acid. The separated product is filtered off, and recrystallized with the use of glacial acetic acid.

Other compounds may be obtained by reacting 1,8-dichloroanthraquinone with the corresponding n-alkylamines in the similar way.

These dyes all give their maximum absorption at 560 nanometers in benzene and their solutions are colored reddish violet.

Embodiment 2

Firstly, the combination of a nematic liquid crystal having negative dielectric anisotropy and the dyestuffs based on this invention is described.

The layer of above mentioned composition may be homeotropically aligned.

This liquid crystal device was composed of two transparent glass plates with a transparent electrode of indium oxide thereon, held parallel to each other at a distance of about 10 microns. The element of this invention was interposed in this space.

The nematic liquid crystal composition having negative dielectric anisotropy employed in this embodiment was a mixture of, and being a composition of 1 : 1 : 1 in weight ratio (designated mixed liquid crystal A). Into this composition, about 1 weight percent of any one of the dyes listed in Tables 1 and 2 was mixed. Furthermore, in order to provide a phase of homeotropic structure, two weight percent of a commercially available surface active agent Nonion LP~20R (made by Nihon Yushi) was added for controlling the molecular arrangement.

The display device with the liquid crystal containing the composition of 1,4-bisalkylanthraquinone or 1,8-bisalkyl-amino-anthraquinone respectively gives a blue or reddish violet color n the absence of electric field. Under an electric field which induces no dynamic scattering, as when an electric field of 20 volts and 1 KHz was applied, the color disappeared, and the colorless state was brought about in all cases.

Such a change of state in the device has never been recognized with hitherto known dyes.

This composition gives a colored scattering state of emulsion when an electric field which induces the dynamic scattering is applied.

Figure 2:
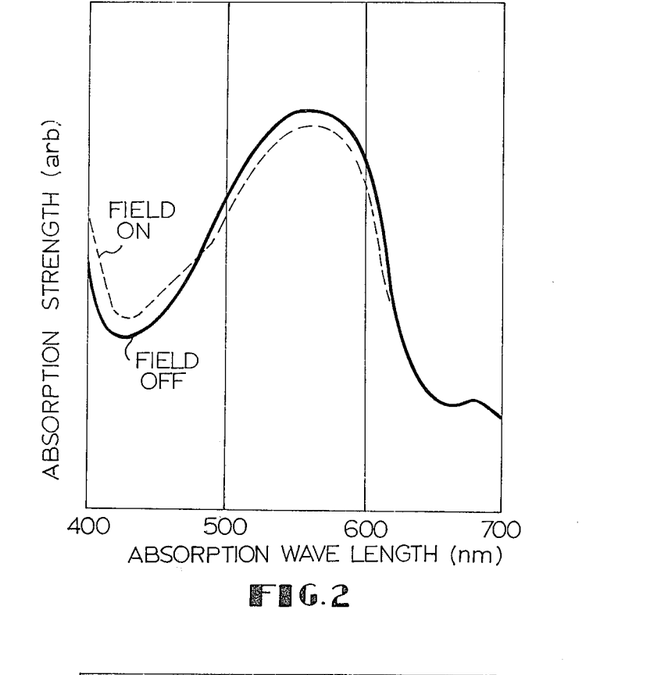
FIG. 2 represents change of optical absorption characteristics of the liquid crystal device which has the homeotropic structure of a nematic liquid crystal composition consisting of a nematic liquid crystal with negative dielectric anisotropy and one of the dyes of this invention, where the field is applied and not applied.

FIG. 2 shows the change of the absorption characteristics of the liquid crystal device when it contained 1,8-bisheptylaminoanthraquinone. The solid line indicates the absorption wave form; and the broken line, the absorption wave form when an electric field of 15 volts and 1 KHz is applied.

Embodiment 3

In the following, a combination of a nematic liquid crystal having positive dielectric anisotropy and the dyestuff of this invention is described:

This liquid crystal layer is used to form an homogeneous structure.

The liquid crystal device was formed by holding parallel to each other two glass plates having transparent electrodes of indium oxide placed thereon, with their surfaces rubbed with a cotton cloth in one direction for the purpose of obtaining homogeneous structure orientation int the liquid crystal layer, so disposed that the rubbing direction of the surface of the first plate and the rubbing direction of the surface of the second plate are parallel to each other, and then, placing the element of this invention in this interspace.

The nematic liquid crystal having the positive dielectric anisotropy employed in this instance is a composition formed by adding 10 weight percent of to the aforementioned mixture composition A of a nematic liquid crystal having negative dielectric anisotropy.

Into this composition, about 1 weight percent of any one of the dyes listed in Table 1 or Table 2 was mixed.

The liquid crystal device in which is housed the element containing 1,4-bisalkylaminoanthraquinone and 1,8-bisalkylaminoanthraquinone shows the colorless state in the absence of electric field, but produces the color of blue or reddish violet when the electric field is applied.

Figure 3:
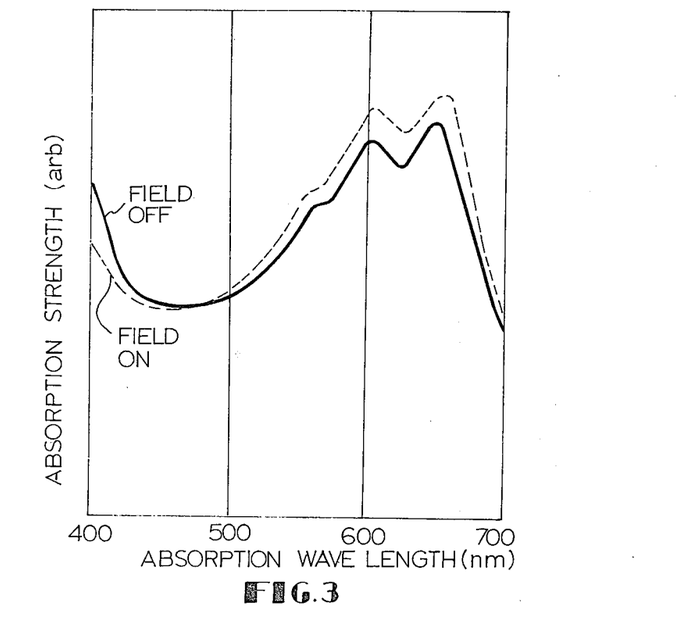
FIG. 3 represents a change of the absorption characteristics of the liquid crystal device which has the homogeneous structure of a nematic liquid crystal composition consisting of nematic liquid crystal with positive dielectric anisotropy and one of the dyes of this invention, where the field is applied and not applied.

FIG. 3 shows the change of the absorption characteristics of the liquid crystal device when it contains 1,4-bisheptylaminoanthraquinone. The solid line indicates the absorption wave form in the absence of the electric field; and the broken line, the absorption wave form when an electric field of 20 volts and 50 Hz was applied.

Embodiment 4

Liquid crystal devices using liquid crystal nematics into which at least two dyes which have different hue and different function in display performance are mixed in combination with the dyes of this invention are described:

Into the liquid crystal device of Embodiment 1, were mixed the dyes of Table 3 in combinations as indicated in Table 4. The colors listed in these tables indicate the colors of the devices produced in the absence of the electric field and when the electric field is applied. The applied electric field is 20 volts and 1 KHz.

Table 3.

| Compound No. | Dye | In the absence of the electric field | When the electric field is applied |
|---|---|---|---|
| 1. | (1,4-bis(butylamino)anthraquinone structure) | Blue | Colorless |
| 2. | (1,8-bis(dodecylamino)anthraquinone structure) | Blue | Colorless |
| 3. | (phenyl-N=N-phenyl-N=N-naphthol structure) | Colorless | Red |
| 4. | (phenyl-N=N-phenyl-N(CH$_3$)$_2$ structure) | Colorless | Yellow |
| 5. | (1,8-bis(octylamino)anthraquinone structure) | Reddish violet | Colorless |
| 6. | (1,4-bis(phenylamino)anthraquinone structure) | Colorless | Blue |

Table 4.

The effect of the combination of dyes on the operation characteristic.

| Sample No. | Mixing proportion of dyes (Weight percent) | | | | | | In the absence of the electric field (Color background) | When the electric field is applied (Color indication) |
|---|---|---|---|---|---|---|---|---|
| | 1 | 2 | 3 | 4 | 5 | 6 | | |
| a | 1 | 0 | 1 | 0 | | | violet | Red |
| b | 0 | 2 | 0 | 1 | | | Green | Yellow |
| c | 2.5 | 0 | 1 | 0 | | | Blue | Red |
| d | 1 | 0 | 1 | 1 | | | Brown | Red |
| e | 1 | 0 | 1 | 3 | | | Green | Orange |
| f | 0 | 0 | 0 | 3 | 0.5 | 0.5 | Orange | Green |

The display with different background colors and indication colors as shown in Table 4 is achieved by making use of the dyes of this invention.

Figure 4:
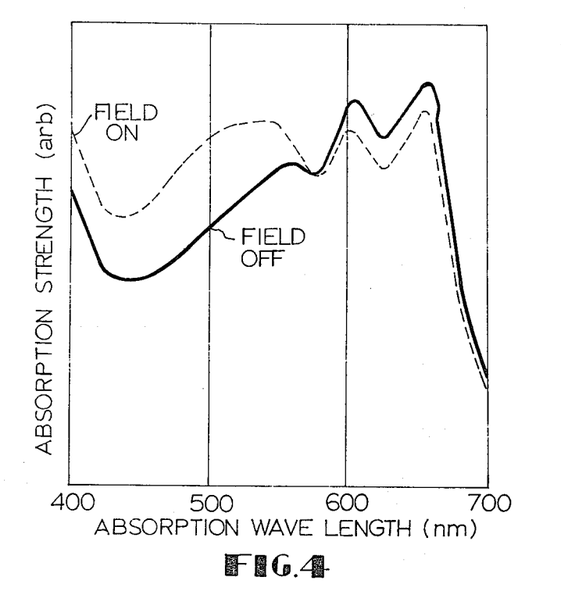
FIG. 4 represents a change of the absorption characteristics of the liquid crystal device which has the homeotropic structure of a liquid crystal composition consisting of a nematic liquid crystal with negative dielectric anisotropy and a mixture of functionally different dyes in combination with the dyes of this invention.

FIG. 4 shows the change of the absorption characteristics of the liquid crystal device housing the sample c. The solid line indicates the absorption wave form in the absence of the electric field; the broken line, when an electric field of 20 volts and 1 KHz was applied.

Embodiment 5

Another example of the liquid crystal device in which the electro-optical element of this invention is used is described hereunder:

A significant display system may be obtained when a linear polarizer is placed in the light path of a liquid crystal device which houses the element consisting of the dyestuffs and the nematic liquid crystals having the positive dielectric anisotropy with their molecules so arranged as to provide the homogeneous structure therein.

Figure 5:
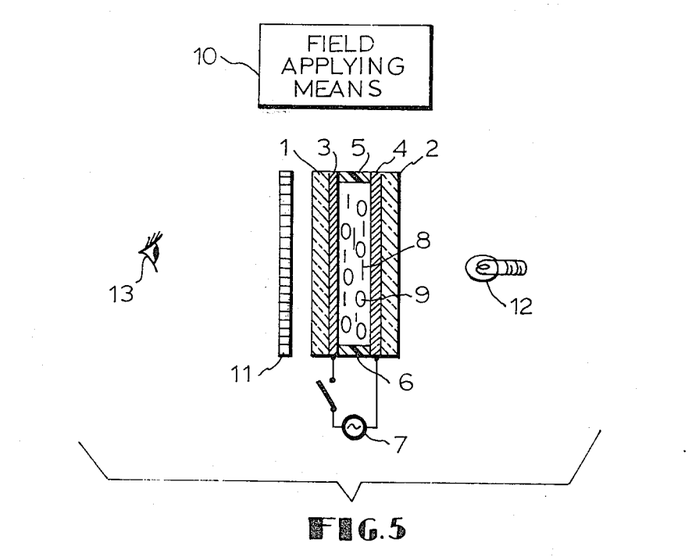
FIG. 5 shows a display device according to this invention, which is effective to obtain a high contrast ratio.

FIG. 5 represents a schematic diagram of this device in which: 1 and 2 denote the transparent members, on the inside surfaces of which are transparent electrodes 3 and 4. They are held parallel to each other at a distance of from several $\mu$ to several $10\mu$, interposed by insulative spacers 5 and 6, and in that interspace, the electro-optical element of this invention (8 designates the liquid crystal molecule, and 9 the dye molecule) is inserted. A means 10 for applying the electric field on the layer of this element from outside is provided. A linear polarizer 11 is placed adjacent to this device. 12 indicates the light source; and 13, the observer.

The liquid crystal device obtained by disposing the nematic liquid crystals containing pleochroic dyes in such a way as to hold their molecular axis parallel and in a certain direction to their contacting surfaces itself possesses the function of a polarizer. The polarization plane of the polarizer is held perpendicular or parallel to the direction of the arrangement of the liquid crystal molecules. The color of the device tinted with the dye turns deeper or weaker, for the benefit of enhanced contrast of indications.

Similar objectives may be achieved by disposing the aforementioned device in the interspace of a pair of polarizers in the similar way.

Furthermore, when a linear color polarizer which selectively absorbs specific colors is put in the light path of the device, a color toned by the absorption characteristic of this polarizer and the absorption characteristic of the dyes in the liquid crystal device results.

This is described hereunder more in detail in connection with the following embodiment:

The employed element has 3 wt %, 1 wt % and 1 wt % respectively of dyes of, (a)

(b) , and (c)

mixed with a similar nematic liquid crystal composition as that of Embodiment 3, consisting of 90 wt % of the mixed liquid crystal A and 10 wt % of This element is placed in the liquid crystal device in such a way that it forms the homogeneous structure in the absence of the electric field.

Table 5 shows the states of the display operation obtained with this liquid crystal device:

Table 5.

| Type of polarizer | In the absence of the electric field | When the electric field is applied |
| --- | --- | --- |
| 1. Without a polarizer | Brown | Green |
| 2. Neutral color linear polarizer | Reddish brown | Green |
| 3. Green linear polarizer | Black | Green |

The results of Table 5 were obtained when the linear polarizer was placed in such a way that its polarization plane was held perpendicular to the direction of the arrangement of the liquid crystal molecules in the liquid crystal device. As is evident from the results, different colors of the device from those produced without the polarizer are displayed since the color of the polarizer is mixed with the color of the dyes.

This liquid crystal device is characterized by its high color contrast and wide visual angle.

As described hereinabove, the electro-optical element of this invention is of high industrial value, for it renders possible the production liquid crystal devices capable of providing a display effect heretofore not attainable.

What is claimed is:

1. An electro-optical element comprising a nematic liquid crystal composition and at least one compound represented by the formula wherein $R_1$ is n-alkyl radical having from 5 to 20 carbon atoms and $R_2$ is an n-alkyl radical having from 4 to 20 carbon atoms.

2. The electro-optical element according to claim 1, wherein at least one of said compounds has the formula where $R_1$ is an n-alkyl radical having from 5 to 12 carbon atoms and is added to said nematic liquid crystal composition in an amount of from 0.5 to 5% by weight.

3. The electro-optical element according to claim 1, wherein at least one of said compounds having the formula where $R_2$ is an n-alkyl radical having from 4 to 8 carbon atoms, and is added to said nematic liquid crystal composition in an amount of from 0.5 to 5% by weight.

4. The electro-optical element according to claim 1 wherein said compound is 1,4-bisdodecylaminoanthraquinone and further comprising 4-(dimethylamino) azobenzene.

5. The electro-optical element according to claim 1 wherein said compound is 1,8-bisoctylaminoanthraquinone and further comprising 1,4-bisphenylaminoanthraquinone and 4-(dimethylamino) azobenzene.

6. The electro-optical element according to claim 1 wherein said compound is 1,4-bisoctylaminoanthraquinone and further comprising 2-hydroxynaphthalene-1-azo-1'-benzene-4'-azobenzene and phenylazoresorcine.

7. An electro-optical display device comprising two parallel transparent members whose inner surfaces have been coated with transparent electrodes; an electro-optical element comprising a nematic liquid crystal composition and at least one compound represented by the formula wherein $R_1$ is an n-alkyl radical having from 5 to 20 carbon atoms and $R_2$ is an n-alkyl radical having from 4 to 20 carbon atoms, said electro-optical element being interposed between said electrodes and having all its molecules in their quiescent state, nonelectrically aligned perpendicular or parallel to such facing surfaces, and means for selectively applying an electric field across said electro-optical element through said electrodes to exceed a threshold electric field.

8. An electro-optical display device according to claim 7, wherein said electro-optical element comprises a nematic liquid crystal composition with net positive dielectric anisotropy which has a homogeneous arrangement and a mixture of dyes consisting of 1,4-bisoctylaminoanthraquinone, 2-hydroxynaphthalene-1-azo-1'-benzene-4'-azobenzene and phenylazoresorcine and further comprising at last one polarizer located adjacent to said transparent members; said nematic liquid crystal composition comprising a nematic liquid crystal with negative dielectric anisotropy and a nematic liquid crystal with positive dielectric anisotropy.

* * * * *